US006741700B1

(12) United States Patent
Kwan

(10) Patent No.: US 6,741,700 B1
(45) Date of Patent: May 25, 2004

(54) LOW INSERTION LOSS CURRENT SENSE CIRCUIT

(75) Inventor: Jonathan Kwan, Ottawa (CA)

(73) Assignee: Catena Networks, Inc., Redwood Shores, CA (US)

( * ) Notice: Subject to any disclaimer, the term of this patent is extended or adjusted under 35 U.S.C. 154(b) by 583 days.

(21) Appl. No.: 09/710,997

(22) Filed: Nov. 9, 2000

(30) Foreign Application Priority Data

Nov. 12, 1999 (CA) .............................................. 2289397

(51) Int. Cl.[7] .......................... H04M 3/00; H04M 7/00; H04M 1/00; H04M 9/00
(52) U.S. Cl. ...................... 379/377; 379/349; 379/391; 379/403
(58) Field of Search ........................... 379/90.01, 93.01, 379/93.05, 93.06, 93.09, 377, 386, 387.01, 399.01, 413.02, 345, 347, 349, 372, 391, 402, 403

(56) References Cited

U.S. PATENT DOCUMENTS

| | | | |
|---|---|---|---|
| 3,991,280 A | 11/1976 | James et al. | |
| 4,096,363 A * | 6/1978 | Earp | 323/357 |
| 4,300,021 A * | 11/1981 | Van Husen | 379/378 |
| 4,458,112 A * | 7/1984 | Svala | 379/405 |
| 4,555,599 A * | 11/1985 | Hackett-Jones et al. | 379/345 |
| 4,764,956 A | 8/1988 | Rosch et al. | 379/413 |
| 4,982,426 A * | 1/1991 | Jakab | 379/402 |
| 5,052,039 A | 9/1991 | Moisin | 379/402 |
| 5,258,713 A | 11/1993 | Rosch et al. | 328/159 |
| 5,274,702 A | 12/1993 | Rosch et al. | 379/399 |
| 5,274,704 A * | 12/1993 | Jakab | 379/403 |
| 5,333,192 A | 7/1994 | McGinn | 379/399 |
| 5,515,433 A | 5/1996 | Chen | |
| 5,661,794 A | 8/1997 | Rosch et al. | 379/399 |
| 5,965,989 A | 10/1999 | Mader | |

* cited by examiner

Primary Examiner—Binh Tieu
(74) Attorney, Agent, or Firm—Townsend and Townsend and Crew LLP; Kenneth R. Allen

(57) ABSTRACT

A current sense circuit for sensing a current in a subscriber loop comprising a transformer having a first and second winding coupled for sensing a differential current in a loop, a sense winding for producing a sense current in response to a magnetic flux induced in the transformer due to the differential current, an amplifier circuit for receiving the sense current and wherein the sense current is indicative of a signal on the loop, and the amplifier being configured such that a transformer introduces a low insertion loss at a frequency of operation of the loop.

12 Claims, 4 Drawing Sheets

LOW INSERTION LOSS CURRENT SENSE CIRCUIT

BACKGROUND OF THE INVENTION

The invention relates generally to Digital Subscriber Line (DSL) systems and particularly to power reduction in DSL line cards.

With the increasing popularity of the Internet, there has been a corresponding increase in the demand for high rate digital transmission over the local subscriber loops of telephone companies. A loop is a twisted-pair copper telephone line coupling a user or subscriber telephone to a central office (CO).

Conventional data communication equipment uses the voice band of the subscriber loop. Such equipment includes voice band modems, which operate at up to 56 kbps using compression techniques. Conventional voice band equipment is limited by the maximum data rate of the existing switching networks and PCM (Pulse Code Modulation) data highways.

Utilizing the frequency bandwidth of the loop outside the voiceband has enabled other high-speed systems to evolve. However because signals degrade with distance traveled, media quality and and transmission characteristics depending on the network, there are limitations and challenges for designers of high-speed systems.

Current high-speed digital transmission systems of the above type include asymmetric, symmetric, high-rate, and very high-rate digital subscriber loops, conventionally known as ADSL, SDSL, HDSL and VDSL respectively. These and similar protocols are known as xDSL protocols.

Of these ADSL is intended to co-exist with traditional voice services by using different frequency spectra on the loop. In today's ADSL systems, the plain old telephone services (POTS) use the frequency spectrum between 0 and 4 kHz and the ADSL uses the frequency spectrum between 30 kHz and 1.1 MHz for data over the telephone line. ADSL also partitions its frequency spectrum with upstream (subscriber to CO) transmission in a lower frequency band, typically 30 kHz to 138 kHz, and with downstream transmission in a higher frequency band, typically 138 kHz to 550 kHz or 1.1 MHz. ADSL uses a discrete multi-tone (DMT) multi-carrier technique that divides the available bandwidth into approximately 4 kHz sub-channels.

Much effort is being expended by various xDSL hardware manufacturers to reduce overall power dissipation of xDSL line cards. Although overall power reduction improvements have been made, significant power improvements in the area of line drivers have not occurred. To make xDSL technology more attractive, the overall power dissipation must be reduced beyond the presently offered solutions. This power dissipation manifests itself in the form of increased operation temperature of the equipment. Current designs to maintain circuits at a reasonable operating temperature include the use of additional fans, air conditioning, heat sinks and space for thermal ventilation. These constraints significantly increase the material, labor and maintenance cost associated with such a system. Furthermore, excessive heat may restrict the density of equipment, thereby increasing the size of the facility hosting the system and/or limiting the number of customers that can be served by a fixed size facility. Thus, reducing the power consumption in xDSL communications systems can be a key aspect of any system design.

A line driver is an amplifier system which consumes a significant amount of power and can dissipate a significant amount of heat. Typically, a line driver includes an amplifier which receives an analog signal from a preceding circuit, such as a digital to analog (DA) converter on the xDSL line card and drives this signal through a source resistance and a line transformer onto the twisted pair telephone line forming the current loop between the CO and the subscriber. The xDSL line drivers commonly in use include a source or feed resistance equal to the reference impedance of the loop, usually 100 ohms implemented as a series resistance. Typical line drivers use two amplifiers working differentially.

Various forms of line interface circuits are known, and which are particularly applicable to POTS systems. For example, U.S. Pat. No. 5,258,713 describes an impedance generator for a telephone line interface circuit which uses a sensing circuit coupled to the feed resistors in series with the tip and ring lines. The sensing circuit produces a feedback signal for use by an impedance generator circuit. U.S. Pat. No. 5,661,794 describes a telephone line interface circuit, wherein the loop current and common mode current through the feed resistors are monitored and converted to digital signals for providing programmable control of the operating conditions of the circuit. Other exemplary line interface circuits are described in U.S. Pat. Nos. 4,764,956, 5,052,039 and 5,333,192. Thus it appears that without exception known line interface circuits, for use either with POST or xDSL systems, utilize a series feed resistance to match the impedance on the line, which is relatively wasteful of power.

FIG. 1 is a block diagram of a typical prior art xDSL line card, represented generally by the numeral 10. The card 10 couples a twisted pair wire 11, or subscriber loop (consisting of TIP and RING lines), to an xDSL transceiver 12 via a loop interface 15. The loop interface typically includes a transformer 16 having its primary winding coupled across the TIP and RING lines and its secondary winding coupled to the xDSL transceiver, splitting the loop into a customer premises side and a CO side. The transceiver 12 includes a sense circuit 13 for measuring the voltage across a set of resistors R1 and R2, inserted in series in the TIP and RING lines on the secondary side of the transformer. The resistors R1 and R2 can form part or extremely the termination impedance of the transceiver 12. The output of the sense circuit 13 is typically a voltage that is proportional to the current through the resistors R1 and R2. The output of the sense circuit 13 is adjusted by a programmable or automatic gain stage 14. The output of the gain stage 14 is filtered by an analog filter 16, and converted to the digital domain by an Analog-to-Digital Converter (ADC) 18. The output of the ADC 18 is sent to a Digital Signal Processor (DSP) 20 or xDSL receiver for processing.

The resistors R1 and R2 are connected to the output of respective line drivers, 22a and 22b, and respective TIP and RING lines to the secondary of the transformer 16. The line drivers serve to drive an output from an xDSL transmitter 21 onto the loop. Therefore, for a given voltage to be driven onto the loop 15, the loop drivers 22a and 22b must deliver a voltage that is higher than the loop voltage in order to account for the voltage drop across the resistors R1 and R2. The voltage drop across the resistors R1 and R2 is referred to as the insertion loss. Insertion loss increases the power dissipation during transmission to the loop and degrades the overall efficiency of the transmitter. As a consequence, what is needed is to obviate or mitigate at least the above disadvantage.

In particular, what is needed is a mechanism compatible with an xDSL loop driver circuit such as that described in U.S. patent application Ser. No. 09/590,890 assigned to the assignee of the present invention.

SUMMARY OF THE INVENTION

In accordance with this invention, there is provided a current sense circuit for sensing a current in a subscriber loop comprising a transformer having a first and second winding coupled for sensing a differential current in said loop, a sense winding for producing a sense current in response to a magnetic flux induced in the transformer due to the differential current, an amplifier circuit for receiving the sense current, the current being indicative of a signal on the loop and configured such that a transformer has a low insertion loss at a frequency of operation of the loop.

In a specific embodiment, the low insertion loss current sense circuit employs a transformer with three windings to sense the differential loop current and two amplifiers to produce a voltage (V1−V2) which is proportionate to the differential loop current and which is for further signal processing.

In a still further embodiment the sense circuit is part of an integrated POTS/xDSL line card.

BRIEF DESCRIPTION OF THE DRAWINGS

Embodiments of the invention will now be described by way of example only, with reference to the accompanying drawings in which.

For convenience like structures in the diagrams are referred to by like numerals in the description.

DESCRIPTION OF THE SPECIFIC EMBODIMENTS

Figure 1:
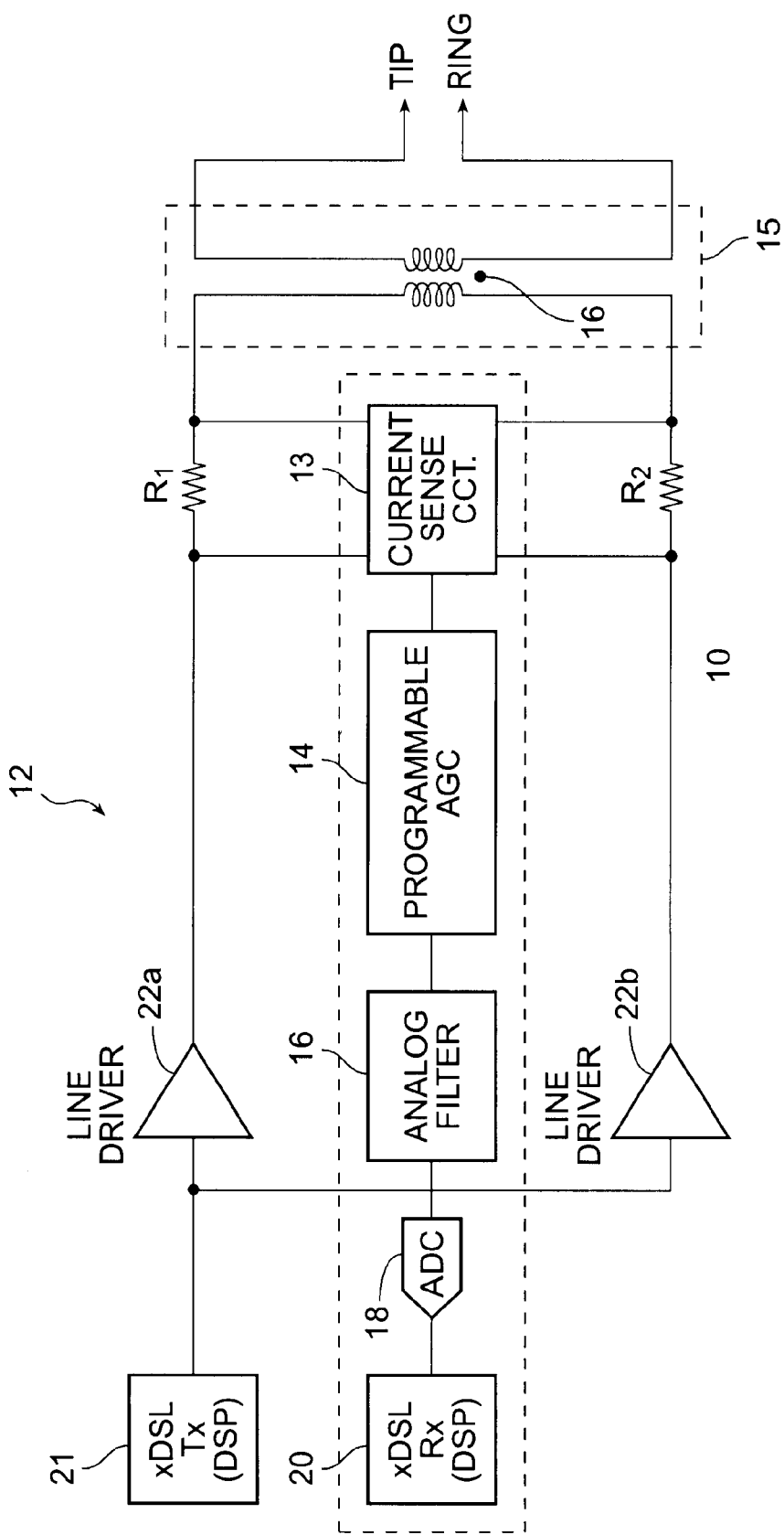
FIG. 1 is a schematic diagram of an xDSL interface circuit showing a current sense circuit according to the prior art.
Figure 2:
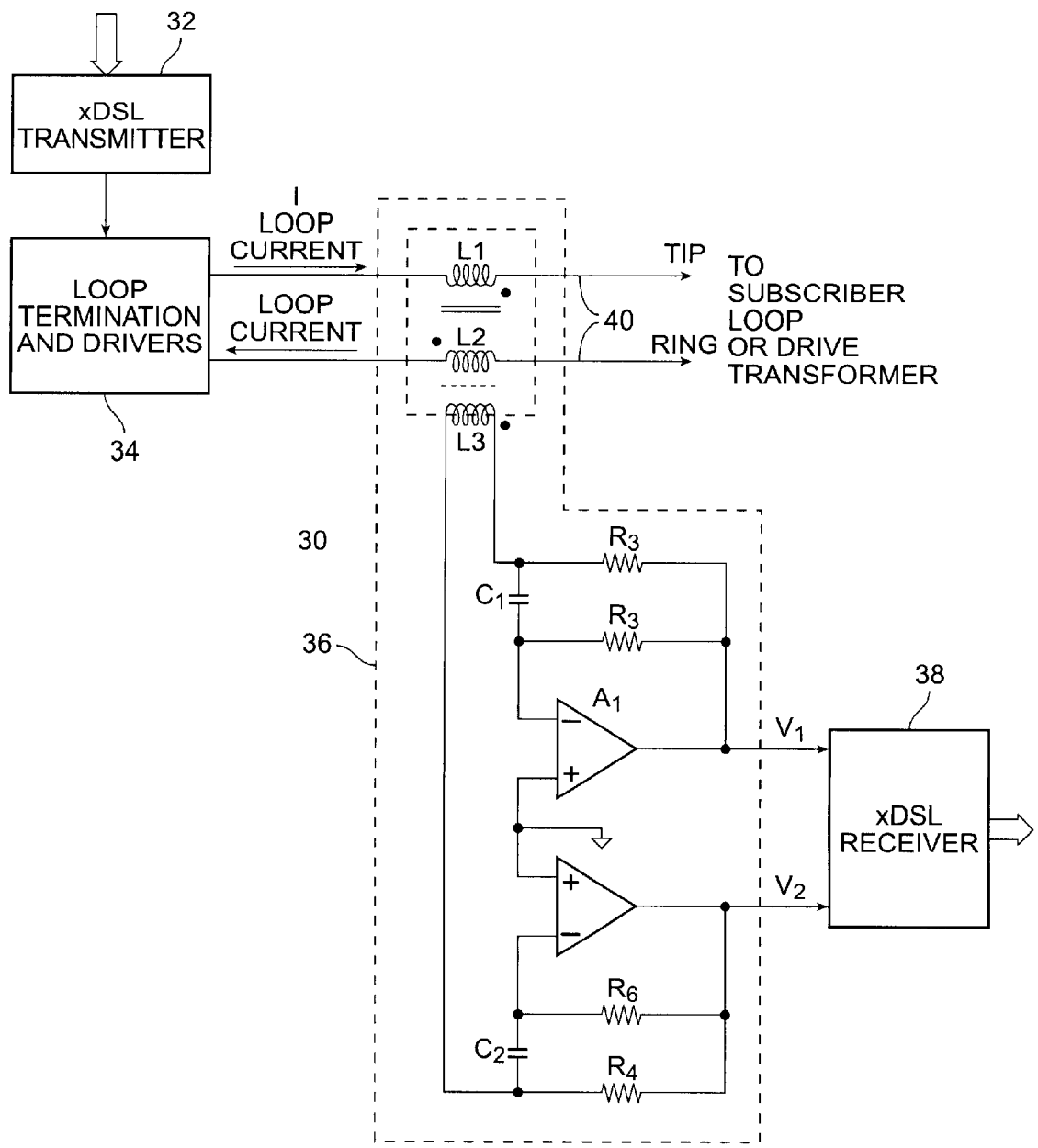
FIG. 2 is a schematic diagram of a low insertion loss current sense circuit.

Referring to FIG. 2, a schematic block diagram of an xDSL transceiver is shown generally by numeral 30. The transceiver 30 includes an xDSL transmitter 32 coupled to a loop termination and driver circuit 34 coupled via a pair of inductors L1 and L2 to respective TIP and RING lines, a current sense circuit 36, which includes the inductors L1 and L2, and an xDSL receiver circuit 38 which receives a signal from the current sense circuit 36.

The current sense circuit 36 comprises the pair of transformer windings L1 and L2, a sense inductor L3 and a current to voltage conversion circuitry for receiving the output current from the inductor L3 and for driving the xDSL receiver 38.

In the current sense circuit 36 transformer windings L1 and L2 are connected in series with the TIP and RING conductors of the subscriber loop 40 and in series with the termination and loop drivers 34. The two windings L1 and L2 have the same number of turns and are arranged such that the magnetic flux in the core will only be produced when a differential current 1 is present in the subscriber loop 40. A third winding L3 is located in proximity to L1 and L2 to pick up the magnetic flux produced in the transformer core by L1 and L2 due to the flow of the differential loop current I. The ratio of the number of turns in winding L3 to the number of turns in windings L1 and L2 determines the level of current flow in L3.

The two ends of the winding L3 are connected to the outputs of amplifiers A1 and A2 via resistors R3 and R4 respectively. Resistors R3 and R4 convert the current induced in L3 into a voltage V1 and V2 that appear differentially across the outputs of A1 and A2. The two ends of winding L3 are also connected to the inverting inputs of amplifiers A1 and A2 via capacitors C1 and C2 respectively.

In the xDSL frequency band of interest, the capacitors C1 and C2 behave like short circuits. In this configuration, each end of the winding L3 is connected into one of the low impedance virtual ground nodes of amplifiers A1 and A2. Since both ends of winding L3 are connected to the virtual ground nodes, the impedance across L3 is virtually zero. The low impedance across L3 is reflected back to L1 and L2 making the impedance of L1 and L2 also virtually zero, hence resulting in virtually no insertion loss.

Resistors R5 and R6 are connected between the inverting input and the output of A1 and A2, respectively. These are large resistors compared to R3 and R4 and provide a DC feedback path for amplifiers A1 and A2.

In an alternate embodiment, it is possible to connect only one end the winding L3 to an amplifier as described in the previous embodiment. The other end of the winding L3 may be connected to ground, and the resultant insertion loss of the circuit will also be virtually zero.

In another embodiment, the transformer may include an additional winding which carries a DC and low frequency current. This additional winding is connected so as to produce magnetic flux in the core of the transformer that partially or totally cancels the magnetic flux in the core produced by L1 and L2 due to DC and low frequency current in those windings.

Due to the low insertion loss nature of the sense windings L1 and L2, the circuit of the present invention can be used in a variety of different xDSL configurations.

Figure 3:
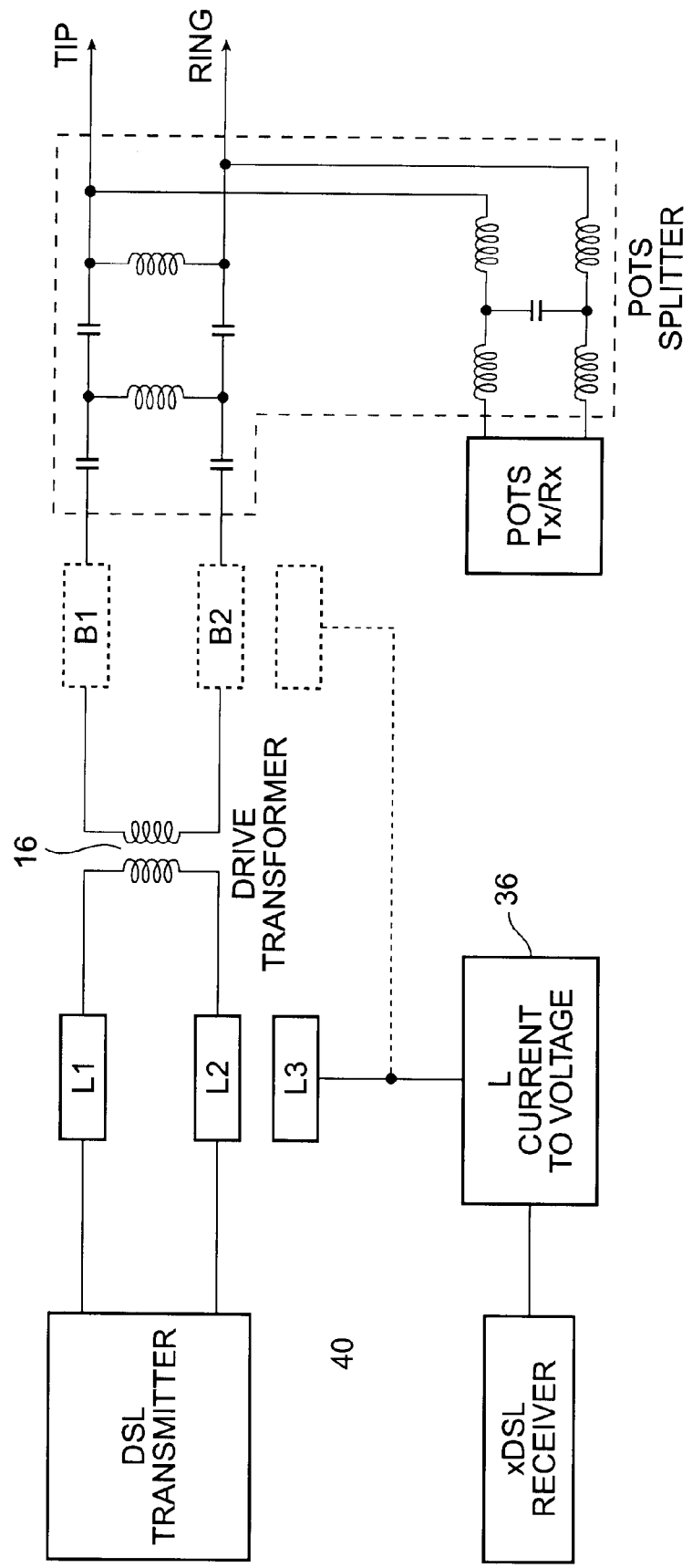
FIG. 3 is a schematic diagram illustrating insertion locations for low insertion loss current sense circuit of FIG. 2.

Referring to FIG. 3, a further embodiment of the invention, shows a xDSL line interface with a POTS (Plain Old Telephone System) Splitter circuit 42, represented generally by the numeral 40. In this configuration, the sense windings can be inserted either on the subscriber loop side of the transformer 16 as windings B1 and B2 or on the line card office side of the transformer as windings L1 and L2.

Figure 4:
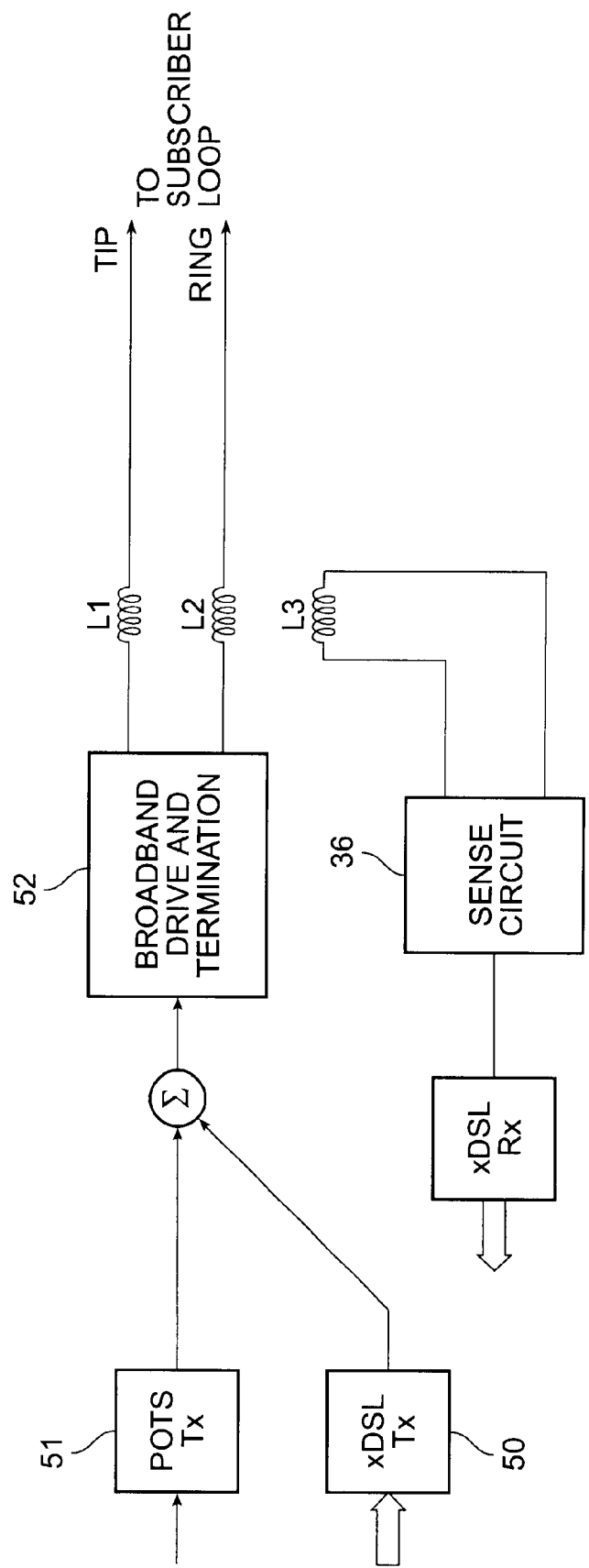
FIG. 4 is a schematic diagram illustrating insertion location for low insertion loss current sense circuit of FIG. 2 for splitterless xDSL.

Referring to FIG. 4, a still further embodiment of the invention is shown wherein an xDSL transmitter 50 shares the same loop 11 as the POTS circuit 51, but uses a broadband loop driver and termination circuit 52. The output from the broadband drive circuit 52 is coupled via transformer windings L1 and L2 to the respective TIP and RING lines as described with reference to FIG. 2. The use of a broadband loop driver 52 eliminates the need for a POTS Splitter. The low insertion loss sense circuit 36 can be used, but the bandwidth of the circuit must be broadened so that the insertion loss is sufficiently low in both the POTS signal band and in the xDSL band. The output of such a broadband, low insertion loss sense circuit contains both POTS and xDSL signals that can be further filtered and processed in either the analog domain or in the digital domain. A broadband loop driver 52 is described in the applicant's copending U.S. patent application Ser. No. 09/590,890 incorporated herein by reference.

Although the invention has been described with reference to certain specific embodiments, various modifications thereof will be apparent to those skilled in the art without departing from the spirit and scope of the invention as outlined in the claims appended hereto.

What is claimed is:

1. An apparatus including a current sense circuit for sensing a current in a subscriber loop, said current sense circuit comprising:

a transformer having a first and second winding coupled for sensing a differential current in said loop;

a sense winding for producing a sense current in response to a magnetic flux induced in said transformer due to said differential current; and an amplifier circuit for receiving said sense current being indicative of a signal on said loop and configured such that said transformer introduces minimal insertion loss at a frequency of operation of said loop.

2. A circuit as defined in claim 1, wherein said first and second windings are coupled in series with respective TIP and RING lines of said loop.

3. A circuit as defined in claim 1, wherein said amplifier circuit has a virtual ground node, and said sense winding is capacitively terminated in said virtual ground node.

4. A circuit as defined in claim 3, wherein said virtual ground node is coupled to both sides of said sense winding.

5. A circuit as defined in claim 1, wherein said sense winding is operative for carrying a DC and low frequency current and is coupled so as to produce magnetic flux in said transformer to reduce magnetic flux due to said windings of said transformer at DC and low frequency.

6. A circuit as defined in claim 1, including a drive transformer having a primary winding coupled to said loop, and wherein said current sense circuit is coupled to a secondary winding of said drive transformer, said current sense circuit having windings of the same number of turns and being arranged such that the magnetic flux in the core will only be produced when a differential current I is present in the subscriber loop.

7. A circuit as defined in claim 1, including a drive transformer having a primary winding coupled to said sense circuit and a secondary winding coupled to an xDSL transmitter.

8. An apparatus as defined in claim 1, wherein the apparatus further comprises:

an xDSL transmitter that transmits first xDSL signals; and an xDSL receiver that receives second xDSL signals, wherein said current sense circuit is coupled between said xDSL transmitter and said xDSL receiver.

9. An apparatus as defined in claim 8, wherein said current sense circuit introduces said minimal insertion loss at an xDSL frequency of operation of said loop.

10. An apparatus as defined in claim 8, wherein said minimal insertion loss results in a savings in power consumption.

11. An apparatus as defined in claim 8, wherein the apparatus further comprises:

a POTS circuit that transmits POTS signals, wherein said current sense circuit is further coupled to said POTS circuit.

12. An apparatus as defined in claim 11, wherein said current sense circuit introduces said minimal insertion loss at an xDSL frequency of operation of said loop and at a POTS frequency of operation of said loop.

* * * * *